Aug. 26, 1969    G. J. GALLEE ET AL    3,463,304

ASSEMBLY OR PACKAGE OF FASTENERS

Filed Sept. 6, 1967

INVENTORS:
GEORGE J. GALLEE
EDWARD J. NOVAK,
By: Mason, Kolehmainen, Rathburn & Wyss,
Attorneys.

United States Patent Office 3,463,304
Patented Aug. 26, 1969

3,463,304
ASSEMBLY OR PACKAGE OF FASTENERS
George J. Gallee, Rosemont, and Edward J. Novak, Franklin Park, Ill., assignors to Fastener Corporation, Franklin Park, Ill., a corporation of Illinois
Filed Sept. 6, 1967, Ser. No. 665,788
Int. Cl. B65d 69/00
U.S. Cl. 206—56                                    5 Claims

ABSTRACT OF THE DISCLOSURE

A nail strip in which the nails are held in spaced parallel positions by a plastic strip extending transversely across the spaced shanks of the nails. The plastic strip includes a series of spaced sleeves which receive the fastener shanks and which are joined by webs having a thickened portion adjacent one sleeve and a thinner section contiguous to the adjacent sleeve. The thin section insures shearing of the web adjacent the next-to-the-end nail when the end nail is driven by a tool, and thus prevents any web projecting from this next-to-the-end nail from interfering with its centering in the drive track of the tool.

---

The present invention relates to an assembly of fasteners and, more particularly, to an assembly or package of fasteners, such as common nails or the like, wherein the shanks of the nails are held in spaced-apart relation by plastic strips extending transversely of the shanks. The assembly or package of fasteners of the present invention is especially adapted for use in fastener driving tools employing a magazine adapted to hold a package of fasteners and including means for feeding the fasteners one at a time into the drive track of the tool wherein they are driven by a reciprocally movable driver element.

The present invention is an improvement over the fastener assemblage shown and described in U.S. Pat. No. 3,212,632, which patent is assigned to the same assignee as the present invention. With the increased usage of fastener driving tools for driving relatively large fasteners, such as 6d or 8d common nails, it is extremely desirable to provide an assembly or package of nails wherein the nails are held in spaced-apart relation by a plastic strip extending transversely across the nail shanks. The strip material must be strong enough so that the strips do not break during handling or insertion of the package into the tool magazine, and at the same time the strips must be somewhat flexible and capable of being readily sheared by the driver of the tool when acting to drive the nails into a workpiece. In many of the prior arrangements difficulty was encountered because shearing action on the strip when a nail is driven does not always take place at the same point along the strip between adjacent nails, and in many cases, projecting sheared off stub portions of the remaining strip prevent the next successive nail from feeding and accurately centering in the drive track of the tool.

It is therefore an object of the present invention to provide a new and improved assembly or package of fasteners for use in a fastener driving tool.

Another object of the invention is the provision of a new and improved assembly or package of fasteners employing strip means extending transversely across the shanks of the fasteners for holding the individual fasteners with their shanks in spaced-apart relation.

Yet another object of the invention is the provision of a new and improved fastener assembly or package of the type described wherein the strip means is strong, flexible, and capable of holding relatively large fasteners, such as common nails or the like, and yet is readily sheared or ruptured as subsequent fasteners in the strip or package are driven by the driver of the tool.

Still another object of the invention is the provision of a new and improved fastener assembly of the character described wherein the strip means is constructed so that shearing or rupturing of the strip will occur at a point or adjacent the fastener that is next in line to be driven and protruding sheared off portions of the remaining strip means in the package do not prevent feeding and accurate centering of the next fastener in the package into the drive track of the tool for driving.

A further object of the present invention is the provision of new and improved strip means for holding an assembly of fasteners with their shanks in spaced-apart relation.

Yet another object of the invention is the provision of a new and improved strip means of the type described which is strong, yet flexible for securely holding the fasteners in an assembled package, which is easy and inexpensive to integrally form and apply to the individual fasteners, and which is designed to effect shearing of the strip means at a selected region adjacent the next successive fastener to be driven as the preceding fastener is driven by the driver of the tool.

For a better understanding of the invention, reference should be had to the following detailed description when taken in conjunction with the claims, in which:

The foregoing objects and advantages of the present invention are accomplished by the provision of a new and improved assembly or package of fasteners, such as common nails and the like, including plastic strip means extending transversely of the nails to hold a number of nails with their shanks in spaced-apart relation. One or more strip means may be used and each is constructed of plastic material and includes a series of spaced-apart sleeves for receiving the spaced-apart nail shanks. Each pair of adjacent spaced-apart sleeves in the strip is integrally joined with a spacer web having a thickened section adjacent one of the sleeves in the pair and the web is reduced to a thinner section adjacent the other sleeve in the pair to facilitate shearing of the web when the nail held in the one sleeve is driven by the tool. The thick and thin sections formed in each spacer web facilitate the shearing of the web in a manner whereby the rupture or shear point occurs adjacent the nail in the other sleeve (i.e., the next succeeding nail to be driven) and the sheared off portions or stubs on the web protruding from this nail do not interfere with accurate feeding and centering of the nail when it is advanced into the drive track of the tool on the next feeding cycle of the tool magazine.

Figure 1:
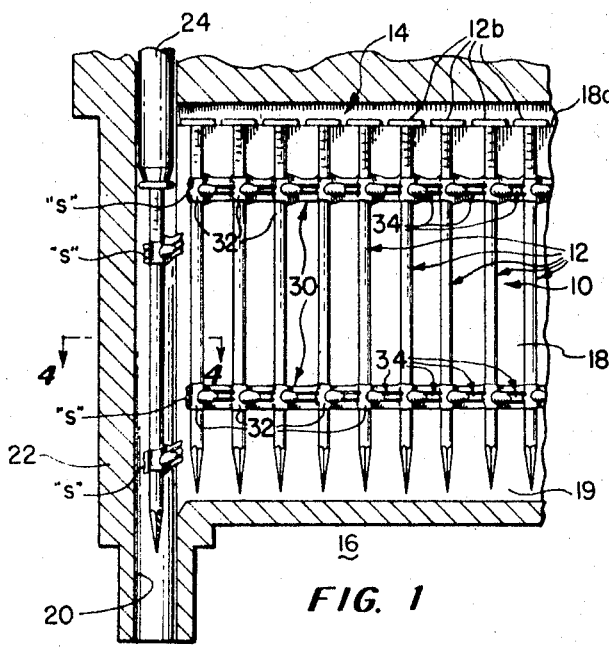
FIG. 1 is a side elevational view of a new and improved assembly or package of fasteners in accordance with the present invention and illustrated in conjunction with portions of a fastener driving tool for driving the fasteners therein.
Figure 2:
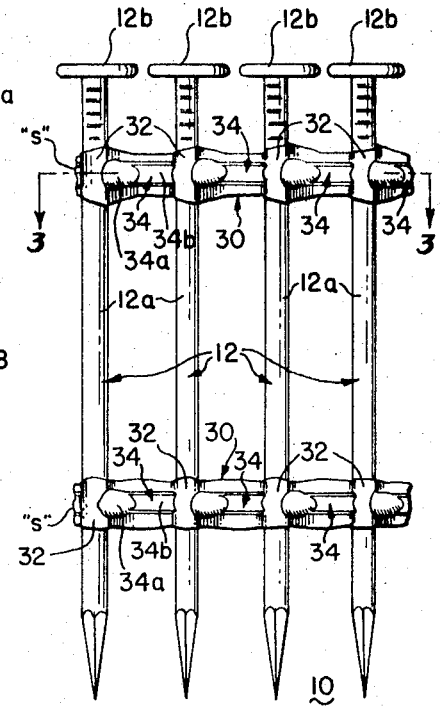
FIG. 2 is an enlarged side elevational view of the assembly of fasteners of FIG. 1.

Referring now, more particularly, to the drawing, therein is illustrated a new and improved assembly or package of fasteners constructed in accordance with the present invention and referred to generally by the reference numeral 10. The fastener assembly or package 10 includes a plurality of fasteners, such as common nails 12 and the like, having elongated shanks 12a arranged in parallel spaced-apart relation and having heads 12b at the upper ends of the shanks arranged in line as shown, or staggered with respect to one another, as illustrated in the aforementioned prior patent. In practice, the fastener assembly 10 may include about twenty nails to provide a package of convenient size which may be easily handled without breakage and easily inserted into the magazine 14 of a fastener driving tool 16. The magazine 14 preferably includes a pair of parallel sidewalls 18 forming a guideway 19, and the sidewalls are spaced apart by a distance slightly greater than the diameter of the nail shanks 12a but less than the diameter of the heads 12b. Each sidewall includes an upper edge 18a (FIG. 1) which supports the heads of the nails in the guideway as the nail package is advanced toward a drive track 20 formed in the tool and communicating with the forward open end of the guideway. The drive track 20 comprises a passage or bore parallel with the nail shanks 12a in the magazine and formed in a downwardly extending nosepiece 22 secured to the body of the tool. A driver 24 is adapted to reciprocate within the drive track to drive nails from the package when they are successively positioned in the drive track of the tool. As shown in FIG. 1, the lower end of the driver 24 engages the head 12b of a nail centered in the drive track and forces the nail rapidly downward on a driving or power stroke into a workpiece (not shown) below the lower end of the nosepiece 22. After a nail has been driven, the driver 24 is moved upwardly on a return stroke and the next (i.e., forwardmost nail) nail in the package is advanced forwardly from the guideway 19 into a centered position in the drive track. Power means (not shown) is provided to actuate the driver 24 on its power and return strokes, and a pusher or feed means associated with the magazine is provided to advance successive nails in the package from the guideway forwardly into the drive track after the completion of each power and return stroke of the driver.

In accordance with the present invention, the group of twenty or so nails 12 making up each fastener assembly or package 10 are held together in the illustrated shank spaced relation by a pair of plastic strips 30 which extend transversely across the shanks 12a. While a pair of such strips are shown, it is to be understood that only a single strip could be used, and when the nails 12 are of relatively small size, such as small brads or the like, only a single strip may be required. With relatively large fasteners, such as 6d or 8d common nails, it is preferred to use a pair of parallel strips 30 as shown, one spaced adjacent and below the nail heads 12b and the other spaced above the pointed lower ends of the nail shanks.

The transversely extending nail holding strips 30 are preferably constructed of a strong, tough, flexible material, such as vinyl plastic of the thermoplastic type, and each strip is preferably formed by applying extruded plastic material in a heated or softened condition to opposite sides of the prepositioned nail shanks. The strips applied to opposite sides of the shank are forced together with heat and pressure and molded into an integral nail holding strip. One process of constructing similar nail holding strips and the equipment therefor is illustrated and described in United States patent application Ser. No. 366,487, filed May 11, 1964, now Patent No. 3,315,436, which patent is assigned to the same assignee as the present invention. The plastic strips 30 may also be constructed in other ways; for example, the strips may be premolded to shape independently of the nails, and the nails inserted into the premolded strips at a later time.

Each of the plastic strips 30 is formed with a series of spaced-apart sleeves 32 for accommodating and holding the nail shanks 12a, and each pair of adjacent sleeves is integrally joined by a spacing web 34 to provide the proper spacing between the nail shanks. The sleeves 32 are shaped to conform generally to the cross section of the nail shanks 12a and have a sufficient wall thickness T (FIG. 3) and length L (FIG. 3a) to firmly secure the nail shanks in place.

Figure 3:
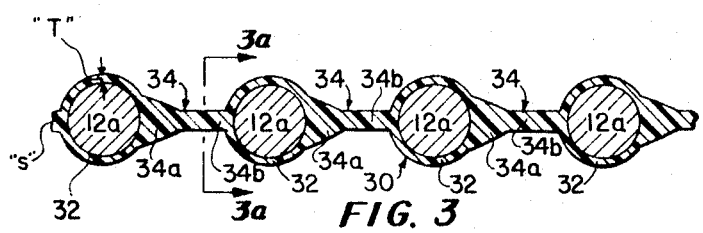
FIG. 3 is a sectional view of the fastener assembly taken substantially along line 3—3 of FIG. 2.
Figure 3A:
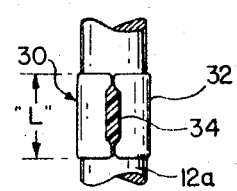
FIG. 3a is a fragmentary sectional view taken substantially along line 3a—3a of FIG. 3.

As shown best in FIG. 3, each spacer web 34 extends between opposite facing portions of adjacent sleeves 32 and includes a thickened section 34a connected to one sleeve and a thinner section 34b connected to the other sleeve. The thinner sections 34b of the spacing webs may be rectangular in cross section (FIG. 3a) and are substantially smaller in transverse cross-sectional area than the thicker sections 34a, which may take the form of a pair of triangular shaped gussets, as best shown in FIG. 3 formed on opposite sides of a common central plane extending through the nail shanks in the package. Preferably, the gussets forming the thickened sections 34a have a maximum lateral dimension adjacent their junction with the sleeves 32 and the gussets are tapered to a reduced dimension at the midsection of the spacer webs between the sleeves. Accordingly, the weakest cross section of the spacer webs 34 is in the thin sections 34b which extend between the midpoint of the web at the junction of the gussets and the junction of the thinner section with a sleeve.

Figure 4:
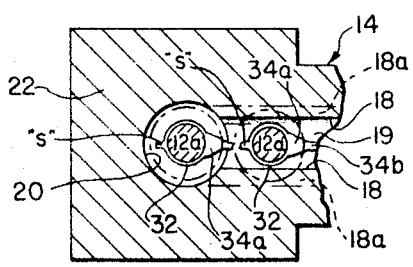
FIG. 4 is an enlarged fragmentary sectional view taken substantially along line 4—4 of FIG. 1.
Figure 5:
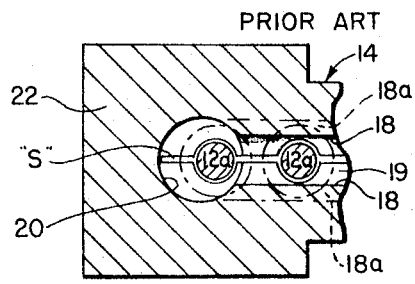
FIG. 5 is a view similar to FIG. 4 but illustrating a prior art arrangement wherein protruding portions of the sheared off strip holding the fasteners prevent accurate feeding and centering of the fasteners in the drive track of a driving tool.

Referring now to FIGS. 1, 4, and 5 of the drawing, a completed fastener assembly or package 10 is inserted into the magazine so that the thickened sections 34a are forward of the thinner sections 34b of the webs in a direction extending toward the drive track of the tool. The assembly is advanced from right to left in the guideway 19 so that nails at the forward (left-hand) end of the nail assembly will be driven in succession. After each nail 12 is driven by the driver 24 and the driver is retracted upwardly on a return stroke, the next nail at the forward end of the package is moved into centered position in the drive track 20. The drive track 20 is slightly larger in cross-sectional diameter than the diameter of the nail heads 12b and when a nail is fed into a centered position in the drive track, as shown in FIGS. 1 and 4, the forward ends of the strips 30 prevent the nail so centered from dropping downwardly out of the drive track until such time as the nail is driven by the driver. The strips 30 also aid in centering the nail shanks 12a in alignment with the central axis of the drive track and help to hold the nail in centered position until a driving blow is initiated by the driver.

Referring specifically to FIG. 5, the diameter of the drive track 20 must be slightly larger in diameter than the heads 12b, in order to accommodate the nails and to permit accurate centering of the nail shanks with the central axis of the drive track. However, if the holding strips of the fastener package in the magazine are not sheared at the proper point between adjacent nail shanks as the nails are driven, relatively long protruding stubs S may remain at the forward end of the strips, and these stubs may prevent subsequent nails in the package from being fed into a properly centered position in the drive track, as shown in FIG. 5. If this occurs, the tool will jam on a driving stroke because the head of the fasteners will not clear the upper edge 18a of the magazine guideway contiguous to the drive track. This problem does not occur with fastener packages 10 of the present invention because of the unique design and construction of the strips 30, which insures that the spacing webs 34 are always ruptured in the thinner sections 34b and, consequently, only relatively short protruding stubs s remain at the forward end of the strips, and these short stubs s are not long enough to interfere with the proper centering of succeeding nails in the drive track. During a sharp downward impact on a nail in the drive track occasioned by a driving stroke of the driver 24, the strips 30 holding the nail are sheared off, as illustrated best in FIGS. 1 and 4, and the strips rupture in the thinner section 34b of the webs adjacent the next succeeding nail in the package. The strips 30, being constructed of flexible plastic material, may stretch or yield slightly during the initial movement of the nail in the drive track being driven, but because of the unique design of the strips. The strips are then almost instantaneously sheared off, in the manner described, adjacent the shank of the next succeeding nail in the package. The sheared off stubs s that extend forwardly of the next nail are not long enough to prevent this nail from being accurately centered in the drive track as the package is advanced to position the next nail in the drive track.

The fastener assembly or package 10 of the present invention is especially adapted for use in automatic fastener driving tools of the type described, and the assembled packages of fasteners 10 are easily and economically produced, easy to handle, and compact in size. The strips 30 give the appearance of a series of teardrop-shaped elements interconnected in a string and are strong, yet readily sheared at the proper place in the thinner sections 34b as each succeeding nail is driven. The unique design of the spacer webs insures that the shearing action takes place at the proper location on the strips so that no centering problems occur as subsequent nails in the package are fed into the drive track.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An assembly of fasteners for use in fasteners driving tools comparing a plurality of fasteners including elongated shanks and arranged with said shanks in a common plane in spaced-apart relation to one another, and strip means extending transversely across said shanks for holding said fasteners in said spaced-apart relation, said strip means comprising a unitary strip of plastic material formed to include a series of spaced-apart hollow sleeves for receiving and holding said shanks and a series of spaced apart, solid spacer webs extending between and integrally joined with opposite facing portions on adjacent pairs of sleeves, each web including a thickened section adjacent one sleeve in a pair and tapered to a reduced cross section forming a thinner section adjacent the other sleeve of the pair whereby longitudinal movement of the fastener in said one sleeve shears said web adjacent said thinner section therof.

2. The fastener assembly of claim 1 wherein each of said fastener holding sleeves has a wall thickness less than the lateral thickness of an adjacent thinner section of said web.

3. The fastener assembly of claim 1 wherein said thickened section of each web tapers from a maximum thickness adjacent the junction with said one sleeve in a pair to a minimum thickness adjacent said thinner section intermediate said opposing facing portions of each pair of adjacent sleeves.

4. The fastener assembly of claim 3 wherein said thickened section is wedge shaped in a cross section thereof taken on a plane normal to the plane of said shanks, said wedge-shaped section extending laterally outwardly on opposite sides of said plane of said shanks.

5. The fastener assembly of claim 4 wherein said wedge-shaped thickened section includes a pair of stiffening gussets extending laterally outwardly from opposite lateral faces of said thinner section of said spacer web.

References Cited

UNITED STATES PATENTS 3,212,632  10/1965  Baum et al.
3,129,814  4/1964   Cheh et al. ____ 198—131 XR
3,170,160  2/1965   Burmiston.

JOSEPH R. LECLAIR, Primary Examiner

JOHN M. CASKIE, Assistant Examiner